(12) United States Patent
Rogers

(10) Patent No.: US 12,008,530 B2
(45) Date of Patent: Jun. 11, 2024

(54) PRESENCE AWARE TERMINALS

(71) Applicant: NCR Voyix Corporation, Atlanta, GA (US)

(72) Inventor: April Rogers, Atlanta, GA (US)

(73) Assignee: NCR Voyix Corporation, Atlanta, GA (US)

( * ) Notice: Subject to any disclaimer, the term of this patent is extended or adjusted under 35 U.S.C. 154(b) by 783 days.

(21) Appl. No.: 15/223,630

(22) Filed: Jul. 29, 2016

(65) Prior Publication Data

US 2018/0032983 A1     Feb. 1, 2018

(51) Int. Cl.
| | |
|---|---|
| G06Q 20/18 | (2012.01) |
| G06Q 20/32 | (2012.01) |
| H04L 9/40 | (2022.01) |
| H04L 67/303 | (2022.01) |
| H04L 67/306 | (2022.01) |
| H04W 4/80 | (2018.01) |
| H04W 12/06 | (2021.01) |

(Continued)

(52) U.S. Cl.
CPC ......... *G06Q 20/18* (2013.01); *G06Q 20/3278* (2013.01); *H04L 67/303* (2013.01); *H04L 67/306* (2013.01); *H04W 4/80* (2018.02); *H04W 12/06* (2013.01); *H04L 63/0853* (2013.01); *H04L 63/0861* (2013.01); *H04L 63/0876* (2013.01); *H04W 12/63* (2021.01); *H04W 12/71* (2021.01); *H04W 88/02* (2013.01)

(58) Field of Classification Search
CPC .. G06Q 20/18; G06Q 20/202; G06Q 20/3224; G06Q 20/20; G06Q 20/3278; G06Q 20/209; H04W 4/80; H04M 1/72519; H04L 43/16; H04L 67/303; H04L 67/306

USPC .......................................................... 705/21
See application file for complete search history.

(56) References Cited

U.S. PATENT DOCUMENTS

2007/0262134 A1\* 11/2007 Humphrey ......... G06Q 20/4014
                                                       235/379
2012/0055988 A1\* 3/2012 Qu ..................... G06K 7/10475
                                                      235/380

(Continued)

OTHER PUBLICATIONS

Aljohani, Abdulkareem. A Unified Mobile Payment Transaction Exchange Service (UMTES) for Next-Generation Mobile Networks University of South Wales (United Kingdom). ProQuest Dissertations Publishing, 2014. (Year: 2014).\*

(Continued)

*Primary Examiner* — Florian M Zeender
*Assistant Examiner* — Fawaad Haider
(74) *Attorney, Agent, or Firm* — Schwegman Lundberg & Woessner, P.A.

(57) ABSTRACT

The various embodiments herein each include at least one of systems, methods, and software for presence aware terminals. Some such embodiments enable a user carrying a mobile device, such as a smartphone, tablet, smartwatch, or a handheld computing device having a radio device (e.g., BLUETOOTH® or Near-Field Communication (NFC)) to be automatically recognized at a terminal. One such embodiment is in the form of a method that executes on a terminal. This method includes transmitting a first signal encoded with data identifying a device-type and receiving a second signal encoded with data including an account identifier. The method may then present a user interface to facilitate user interaction with an account of the account identifier.

9 Claims, 4 Drawing Sheets

(51) Int. Cl.
  *H04W 12/63* (2021.01)
  *H04W 12/71* (2021.01)
  *H04W 88/02* (2009.01)

(56) References Cited

U.S. PATENT DOCUMENTS

| | | | | |
|---|---|---|---|---|
| 2015/0031388 A1* | 1/2015 | Chatterjee | ............ | G06Q 20/322 |
| | | | | 455/456.1 |
| 2016/0080943 A1* | 3/2016 | Ives-Halperin | ........ | G06Q 10/02 |
| | | | | 713/168 |
| 2016/0125389 A1* | 5/2016 | Morgan | .................. | H04W 4/02 |
| | | | | 705/40 |
| 2017/0359689 A1* | 12/2017 | Chhabra | ............... | H04W 8/005 |

OTHER PUBLICATIONS

Shrestha, Babins. Context-enhanced mobile device authorization and authentication. The University of Alabama at Birmingham. ProQuest Dissertations Publishing, 2016. (Year: 2016).*

De Bruin, Rossouw. A Wallet-Less Mobile Payment System Using near Field Communication (NFC). University of Johannesburg (South Africa) ProQuest Dissertations Publishing, 2014 (Year: 2014).*

Xu, Haifeng. A self-organizing wireless sensor network and distributed computing engine for commodity and future palmtop computers. University of Pittsburgh ProQuest Dissertations Publishing, 2015.3735881. (Year: 2015).*

* cited by examiner

PRESENCE AWARE TERMINALS

BACKGROUND INFORMATION

Terminals, such as may be located in restaurants, stores, within factories, on workplace desktops, and elsewhere, may take different forms. The forms of such terminals may be desktop and laptop personal computers, tablets, handheld computing devices, and other computing devices. Terminals may also be deployed for different purposes, such as in restaurants and stores as Self-Service Terminals (SSTs) on which different activities may be performed, such as ordering food, scanning and paying for items in a store, researching items offered for sale, interacting with a loyalty account a customer has with a retailer, operating a checkout stand by a teller, and the like. Similarly, terminals in workplaces may be deployed for different purposes, such as on a worker's desktop, in a factory to control a machine, in an office to control office equipment. Many of such terminals have controlled access for all or some functionality. For example, customers are not to have access to control teller-assisted checkout terminals, a terminal on the desk of an employee should be accessed only by that employee, and some employees may be able to access limited functionality on a terminal that controls a machine in a factory while other employees can access all functionality.

Access to terminals and the functionality they expose to users has traditionally be controlled through user identifiers and passwords. It is not uncommon though for passwords to be forgotten, to expire, or otherwise not work. Further, for users that are customers at stores, restaurants, and the like, such user identifiers and passwords may not be frequently used and therefore are easily forgotten. Such user identifiers and passwords often give rise to many issues that cause delays for customers, on production lines, in offices, in workplaces, and other locations where terminals are deployed.

SUMMARY

The various embodiments herein each include at least one of systems, methods, and software for presence aware terminals. Some such embodiments enable a user carrying a mobile device, such as a smartphone, tablet, smartwatch, or a handheld computing device having a radio device (e.g., BLUETOOTH® or Near-Field Communication (NFC)) to be automatically recognized at a terminal. The radio device of such a mobile device in some embodiments transmits a radio signal that is received by a terminal and is used to identify the user carrying the mobile device. The user may be identified based on a known MAC address of the radio on the mobile device, a data item included in the radio signal, and the like. The terminal may than provide the user access to the terminal. As such radio devices as BLUETOOTH® and NFC radio have a short range and the signal strength can be considered as well to approximate a distance between the mobile device and a terminal, the user may be determined with relative certainty. In some embodiments, additional security may be desired and security functions the mobile device may be used, such as providing a password on the user device, a biometric input such as a fingerprint, or requiring input within a particular mobile device app. Once the user is identified on the terminal, an application or app on the terminal may retrieve data to present to the user or to inform a process that executes thereon.

One such embodiment is in the form of a method that executes on a terminal. This method includes transmitting a first signal encoded with data identifying a device-type and receiving a second signal encoded with data including an account identifier. The method may then present a user interface to facilitate user interaction with an account of the account identifier.

Another embodiment is in the form of a method that may be performed by a mobile device. This method includes receiving a radio signal from a terminal including a terminal-type identifier encoded therein and replying to the radio signal with a reply signal including an account identifier encoded therein identifying an account with which a user will interact on the terminal.

Yet another embodiment is in the form of a terminal. A terminal in such embodiments may include a display device, at least one network interface device, a short-range radio transceiver device, at least one processor. The terminal further includes at least one memory device storing instructions that are executable by the at least one processor to perform data processing activities. The data processing activities may include transmitting, via the short-range radio transceiver device, a first signal encoded with data identifying a terminal-type. The data processing activities also include receiving, via one of the short-range radio transceiver device and the at least one network interface device, a second signal encoded with data including an account identifier. The data processing activities may then present, on the display device, a user interface to facilitate user interaction with an account of the account identifier.

DETAILED DESCRIPTION

Figure 1:
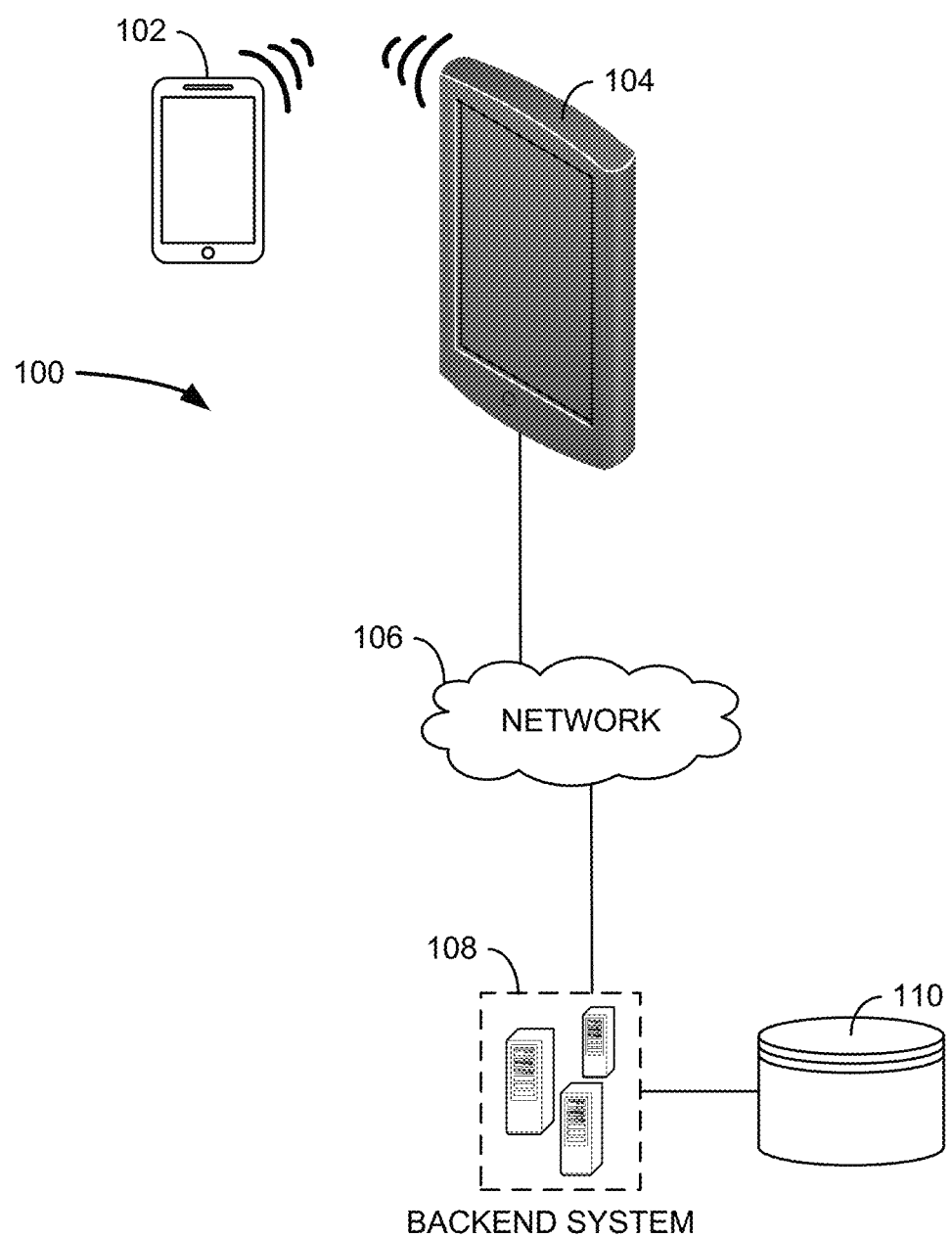
FIG. 1 is an architectural diagram of a system, according to an example embodiment.

As mentioned above, the various embodiments herein each include at least one of systems, methods, and software for presence aware terminals. Some such embodiments enable a user carrying a mobile device, such as a smartphone, tablet, smartwatch, or a handheld computing device having a radio device (e.g., BLUETOOTH® or Near-Field Communication (NFC)) to be automatically recognized at a terminal. The radio device of such a mobile device in some embodiments transmits a radio signal that is received by a terminal and is used to identify the user carrying the mobile device. The user may be identified based on a known MAC address of the radio on the mobile device, a data item included in the radio signal, and the like. The terminal may than provide the user access to the terminal. Note that the mobile device need not be connected to a network for some such embodiments to work. In some such embodiments, for example, the mobile device only needs to communicate with the terminal via direct radio communications between the mobile device and the terminal.

As such radio devices as BLUETOOTH® and NFC radio have a short range and the signal strength can be considered as well to approximate a distance between the mobile device and a terminal, the user may be determined with relative certainty. In some embodiments, additional security may be desired and security functions the mobile device may be used, such as providing a password on the user device, a biometric input such as a fingerprint, or requiring input within a particular mobile device app. Once the user is identified on the terminal, an application or app on the terminal may retrieve data to present to the user or to inform a process that executes thereon.

Through such embodiments, a terminal may be automatically unlocked and made ready for the user when the user approaches the terminal thereby removing any need for the user to login. Additionally, the time for a user to login is virtually eliminated and the user's ability to remember login credentials becomes irrelevant.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is an architectural diagram of a system 100, according to an example embodiment. The system 100 includes a mobile device 102 and a terminal 104. The terminal 104 is connected to at least one network 106. Also connected to the network 106 is a backend system 108, such as a system to which orders in a restaurant may be sent when the terminal 104 is deployed as an SST in a quick serve restaurant to receive food orders.

The mobile device 102 may be a smartphone, tablet, smartwatch, handheld computing device, and the like. The mobile device 102 includes at least one radio transceiver device, such as a short-range radio transceiver device. Such radio transceiver devices may include BLUETOOTH® and NFC.

The terminal 104 is a computing device that may be of various computing device types. The computing device types may be personal computers, tablets, handheld computing devices, smartphones, custom computing devices, and the like. Just as the mobile device 102 includes a short-range radio transceiver device, so does the terminal 104. The terminal 104 also includes at least one network interface device, which may be wired and wireless devices, that are used to connected with and communicate data over the network 106.

In some embodiments, the short-range radio device of the mobile device 102 is used to transmit a radio signal in response to a radio signal received from the short-range radio device of the terminal 104 that identifies the terminal-type. The terminal-type identifying signal received by the mobile device 102 from the terminal 104, is received by an app on the mobile device and the app determines if the terminal-type is of interest, such as a terminal deployed at a restaurant or retailer where the user has a loyalty account, a library where the user has a library card, a with a machine in a factory the user controls, and the like.

The radio signal transmitted by the mobile device 102 in reply to the radio signal received from the terminal 104 includes data that uniquely identifies the user. That data may be a user identifier, a MAC address of the radio device, a GUID of the mobile device, and other unique identifiers that are known either to the terminal 104 or in data stored by the backend system 108 or in the database 110. Note however that the user may be identified simply by the mobile device transmitting a radio signal, either by the short-range radio device or by another radio device such as a WI-FI® radio device, that includes a unique identifier. That unique identifier may be a MAC address or other identifier that is unique to the transmitting radio device that is also known to the terminal 104, the backend system 108, or in data stored in the database 110.

In one embodiment, the terminal 104 broadcasts a radio signal that identifies the terminal-type. The radio signal is received by the mobile device 102 and an app thereon determines with the terminal-type is of interest. When the terminal-type is of interest, the app causes the mobile device 102 to reply with a radio signal identifying the user of the mobile device 102. The terminal 104 receives the radio signal with user identifying data and determines whether to unlock the terminal 104 or set up the terminal for use by the user, depending on the particular embodiment. To make the terminal 104 ready, the terminal 104 may consult locally stored data. However, in some embodiments, the terminal 104 may instead retrieve data or call a process over the network 108 on the backend system 108 based on the user identifier. The result may be an authentication of the user to use the terminal, a dataset that is used to populate a user interface of the terminal 104, data identifying a set of functionality that is to be enabled for the user, and the like. The result is returned to the terminal 104 from the backend system 108 via the network.

Figure 2:
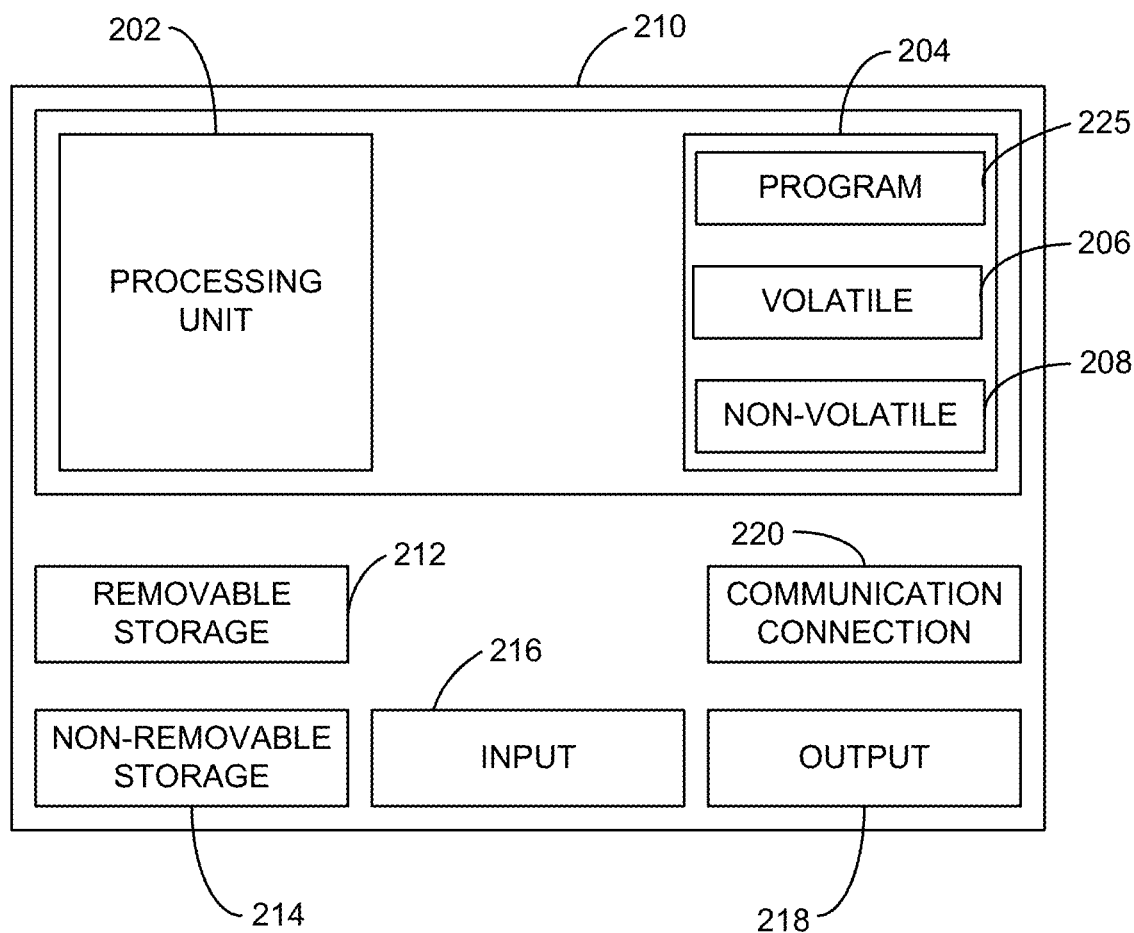
FIG. 2 is a block diagram of a computing device, according to an example embodiment.

FIG. 2 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. The computing device of FIG. 2 is a general example that may be deployed as the mobile device 102, the terminal 104, and the backend system 108 of FIG. 1.

One example computing device in the form of a computer 210, may include a processing unit 202, memory 204, removable storage 212, and non-removable storage 214.

Although the example computing device is illustrated and described as computer 210, the computing device may be in different forms in different embodiments. For example, the computing device may instead be a smartphone, a tablet, smartwatch, or other computing device including the same or similar elements as illustrated and described with regard to FIG. 2. Devices such as smartphones, tablets, and smartwatches are generally collectively referred to as mobile devices. Further, although the various data storage elements are illustrated as part of the computer 210, the storage may also or alternatively include cloud-based storage accessible via a network, such as the Internet.

Returning to the computer 210, memory 204 may include volatile memory 206 and non-volatile memory 208. Computer 210 may include—or have access to a computing environment that includes a variety of computer-readable media, such as volatile memory 206 and non-volatile memory 208, removable storage 212 and non-removable storage 214. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 210 may include or have access to a computing environment that includes input 216, output 218, and a communication connection 220. The input 216 may include one or more of a touchscreen, touchpad, mouse, keyboard, camera, one or more device-specific buttons, one or more sensors integrated within or coupled via wired or wireless data connections to the computer 210, and other input devices. The computer 210 may operate in a networked environment using a communication connection 220 to connect to one or more remote computers, such as database servers, web servers, and other computing device. An example remote computer may include a personal computer (PC), server, router, network PC, a peer device or other common network node, or the like. The communication connection 220 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 220 may also or alternatively include a transceiver device, such as a BLUETOOTH® device that enables the computer 210 to wirelessly receive data from and transmit data to other BLUETOOTH® devices.

Computer-readable instructions stored on a computer-readable medium are executable by the processing unit 202 of the computer 210. A hard drive (magnetic disk or solid state), CD-ROM, and RAM are some examples of articles including a non-transitory computer-readable medium. For example, various computer programs 225 or apps, such as one or more applications and modules implementing one or more of the methods illustrated and described herein or an app or application that executes on a mobile device or is accessible via a web browser, may be stored on a non-transitory computer-readable medium.

Figure 3:
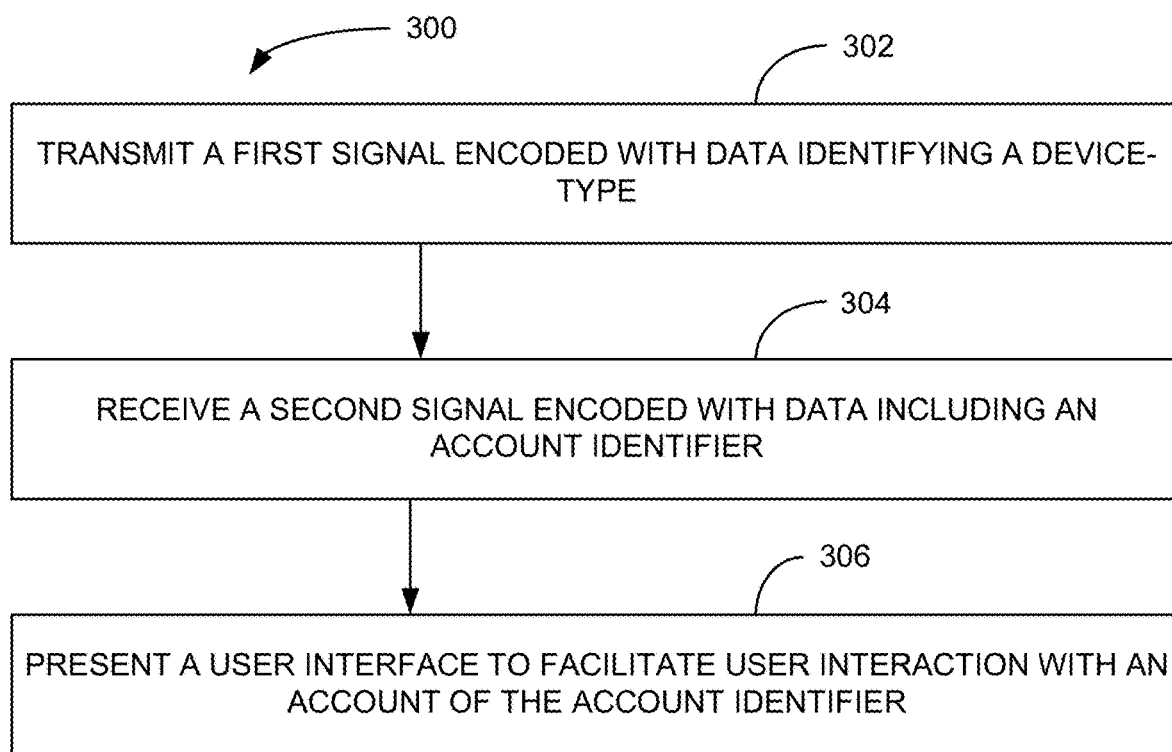
FIG. 3 is a block flow diagram of a method, according to an example embodiment.

FIG. 3 is a block flow diagram of a method 300, according to an example embodiment. The method 300 is an example of a method that may be performed by a terminal 104 of FIG. 1.

The method 300 includes transmitting 302 a first signal encoded with data identifying a device-type and receiving 304 a second signal encoded with data including an account identifier. The method 300 further includes presenting 306 a user interface to facilitate user interaction with an account of the account identifier.

In some embodiments, the presented 306 user interface requests order input, such as an order within a quick service restaurant or merchandise within a store.

Some embodiments of the method 300 further include retrieving account data based on the account identifier. In such embodiments, presenting 306 the user interface may include populating the user interface with at least a portion of the retrieved account data to enable the user interaction with the account of the account identifier. The populating of the user interface with at least the portion of the retrieved account data in some embodiments includes a name of a holder of the account of the account identifier. In these and some other embodiments of the method 300, the retrieved account data includes data representative of a transaction performed with regard to the account, such as a previous order, a banking deposit or withdrawal, and other transaction types. Further, the account data in some such embodiments is retrieved and the user interface is presented only when a strength of the second signal meets a threshold signal strength indicating a device that transmitted the second signal is in close proximity to a terminal performing the method.

In some other embodiments of the method 300, the first signal and the second signal are transmitted and received, respectively, via a short-range radio transceiver device included within a terminal on which the method 300 is performed. As discussed above, the terminal may be a self-service terminal on which a transaction associated with the account of the account identifier can be initiated and payment can be received. Such a terminal may be a tabletop device in a restaurant on which a customer may enter an order and make a payment with a bankcard, such as a debit or credit card.

In another embodiment of the method 300, the presented 306 user interface first requests account login input. The account login input may be a password, but in some embodiments the login input may be biometric input, such as a finger print, a view of a face that may be captured by a camera of a terminal, a retinal scan, and the like.

Figure 4:
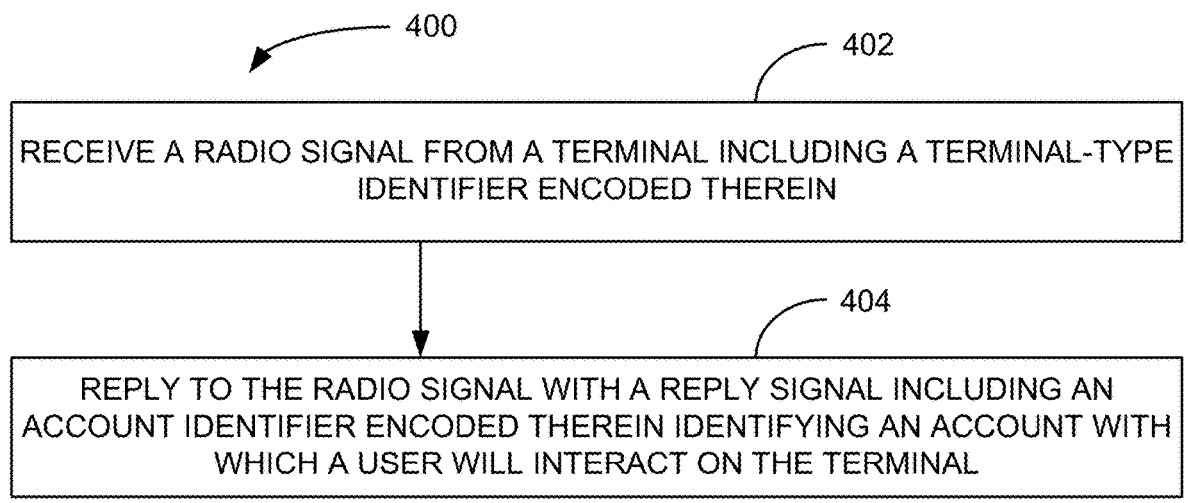
FIG. 4 is a block flow diagram of a method, according to an example embodiment.

FIG. 4 is a block flow diagram of a method 400, according to an example embodiment. The method 400 is an example of a method that may be performed by the mobile device 102 of FIG. 1.

The method 400 includes receiving 402 a radio signal from a terminal including a terminal-type identifier encoded therein. The method 400 further includes replying 404 to the radio signal with a reply signal including an account identifier encoded therein identifying an account with which a user will interact on the terminal. In some embodiments, the reply 404 signal is transmitted via a radio transceiver device that received the radio signal. In other embodiments, the reply signal is transmitted via the another radio device, such as a wireless network device.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
   transmitting, from a terminal via a short-range radio transceiver device to a user mobile device, a first signal encoded with data identifying a device-type;
   receiving, at the terminal via the short-range radio transceiver device and at least one network interface device from the user mobile device in response to the transmitted first signal, a second signal encoded with data including an account identifier;
   retrieving account data based on the account identifier received from the user mobile device;
   automatically logging the user into the account using the account data for a self-service transaction at the terminal and unlocking the terminal for interaction with the user during the self-service transaction based on a verification that the user has already provided a password or biometric input on the user mobile device; and
   presenting, on a display of the terminal, a user interface to facilitate user interaction with the account of the account identifier,
   wherein:
      presenting the user interface includes populating the user interface with at least a portion of the retrieved account data to enable the user interaction with the account of the account identifier,
      the account data is retrieved and the user interface is presented only when a strength of the second signal meets a threshold signal strength indicating a device that transmitted the second signal is in close proximity to a terminal performing the method and the account data is presented after the user interface uses a camera of the terminal to capture a view of a face of the user and associates the face with the account data of the user;
      the first signal and the second signal are transmitted and received, respectively, via a short-range radio transceiver device included within a terminal on which the method is performed; and
      the terminal is a self-service terminal on which the self-service transaction associated with the account of the account identifier is initiated and payment is received via a contactless payment device.

2. The method of claim 1, wherein the user interface requests order input.

3. The method of claim 1, wherein the populating of the user interface with at least the portion of the retrieved account data includes a name of a holder of the account of the account identifier.

4. The method of claim 1, wherein the retrieved account data includes data representative of the self-service transaction performed with regard to the account.

5. The method of claim 1, wherein the second signal is transmitted by a mobile device.

6. The method of claim 1, wherein the first signal is transmitted by a short-range radio transceiver device of a terminal performing the method and the second signal is received via a network interface device of the terminal.

7. A terminal comprising:
   a display device;
   at least one network interface device;
   a short-range radio transceiver device;
   at least one processor; and
   at least one memory device storing instructions that are executable by the at least one processor to perform data processing activities, the data processing activities comprising:
      transmitting, via the short-range radio transceiver device, a first signal encoded with data identifying a terminal-type;
      receiving, via one of the short-range radio transceiver devices and the at least one network interface device in response to the transmitted first signal, a second signal from a mobile device encoded with data including an account identifier;
      automatically logging the user into an account associated with the account identifier for a self-service transaction at the terminal and unlocking the terminal for interaction with the user during the self-service transaction based on a verification that the user has already provided a password or biometric input on the mobile device; and
      presenting, on the display device of the terminal, a user interface to facilitate user interaction with the account of the account identifier received from the mobile device, wherein presenting the user interface to facilities user interaction with the account of the account identifier includes:
      retrieving, from a database via the at least one network interface device, account data based on the account identifier;
      populating the user interface with at least a portion of the retrieved account data to enable the user interaction with the account of the account identifier, wherein the account data is retrieved and the user interface is populated and presented only when a strength of the second signal meets a threshold signal strength indicating a device that transmitted the second signal is in close proximity to the terminal; and
      wherein:
         the account data is retrieved and the user interface is presented only when the strength of the second signal meets the threshold signal strength indicating a device that transmitted the second signal is in close proximity to a terminal performing the method; and
         the account data is presented after the user interface uses a camera of the terminal to capture a view of a face of the user and associates the face with the account data of the user;
         the first signal and the second signal are transmitted and received, respectively, via a short-range radio transceiver device included within a terminal on which the method is performed; and
         the terminal is a self-service terminal on which the self-service transaction associated with the account of the account identifier is initiated and payment is received via a contactless payment device.

8. The terminal of claim 7, wherein the terminal is a tablet computing device.

9. The terminal of claim 7,
wherein the terminal is a self-service terminal on which a transaction associated with the account of the account identifier can be initiated and payment can be received via the at least one bankcard input device.

* * * * *